United States Patent
Cheng

(10) Patent No.: US 11,801,830 B2
(45) Date of Patent: Oct. 31, 2023

(54) CONTROL DEVICE AND METHOD FOR VEHICLE

(71) Applicant: Fulian Yuzhan Precision Technology Co., Ltd, Shenzhen (CN)

(72) Inventor: Hao-En Cheng, New Taipei (TW)

(73) Assignee: Fulian Yuzhan Precision Technology Co., Ltd, Shenzhen (CN)

( * ) Notice: Subject to any disclaimer, the term of this patent is extended or adjusted under 35 U.S.C. 154(b) by 273 days.

(21) Appl. No.: 17/369,842

(22) Filed: Jul. 7, 2021

(65) Prior Publication Data

US 2022/0017075 A1    Jan. 20, 2022

(30) Foreign Application Priority Data

Jul. 14, 2020   (CN) .......................... 202010676600.5

(51) Int. Cl.
| | |
|---|---|
| *B60W 30/06* | (2006.01) |
| *G06T 7/13* | (2017.01) |
| *B60W 60/00* | (2020.01) |
| *G06K 7/14* | (2006.01) |
| *G06T 5/00* | (2006.01) |
| *G06T 7/00* | (2017.01) |

(52) U.S. Cl.
CPC .......... *B60W 30/06* (2013.01); *B60W 60/001* (2020.02); *G06K 7/1417* (2013.01); *G06T 5/003* (2013.01); *G06T 7/0002* (2013.01); *G06T 7/13* (2017.01); *B60W 2420/42* (2013.01); *G06T 2207/30168* (2013.01); *G06T 2207/30264* (2013.01)

(58) Field of Classification Search
CPC ............... B60W 30/06; B60W 60/001; B60W 2420/42; G06T 7/13; G06T 5/003; G06T 7/0002; G06T 2207/30168; G06T 2207/30264; G06K 7/1417
See application file for complete search history.

(56) References Cited

FOREIGN PATENT DOCUMENTS

| | | | | |
|---|---|---|---|---|
| CN | 109993712 A | * | 7/2019 | ......... G06K 9/00979 |
| CN | 110969655 A | * | 4/2020 | |

\* cited by examiner

*Primary Examiner* — Aryan E Weisenfeld
*Assistant Examiner* — Jeffrey R Chalhoub
(74) *Attorney, Agent, or Firm* — ScienBiziP, P.C.

(57) ABSTRACT

A control device for vehicle is provided, and includes a communicator configured to receive first image information from a camera device and a processor coupled to the communicator and configured to: extract label information in the first image information; perform edge detection on the label information and extract a total number of edges; normalize the total number of edges to form a first label clarity; and when the first label clarity is greater than or equal to a preset threshold, control the vehicle to move to a parking position according to the first image information. A control method for vehicle is also provided. The present disclosure can effectively reduce the number of starts and stops of the vehicle and shorten the parking time of the vehicle.

12 Claims, 5 Drawing Sheets

CONTROL DEVICE AND METHOD FOR VEHICLE

CROSS-REFERENCE TO RELATED APPLICATIONS

This application claims priority to Chinese Patent Application No. 202010676600.5 filed on Jul. 14, 2020, the contents of which are incorporated by reference herein.

FIELD

The subject matter herein generally relates to automation control technology, and particularly to a control device and a control method for vehicle.

BACKGROUND

When transporting materials, an unmanned automatic vehicle needs to calculate a label and a position of an image capture device from an image captured by the image capture device, and then calculate a parking position. When the vehicle is parked, a clear image can be obtained only after the vehicle is completely stationary, and then repositioning and adjustments are performed. In this way, the vehicle needs to start and stop continuously, and at the same time, parking time of the vehicle is increased.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
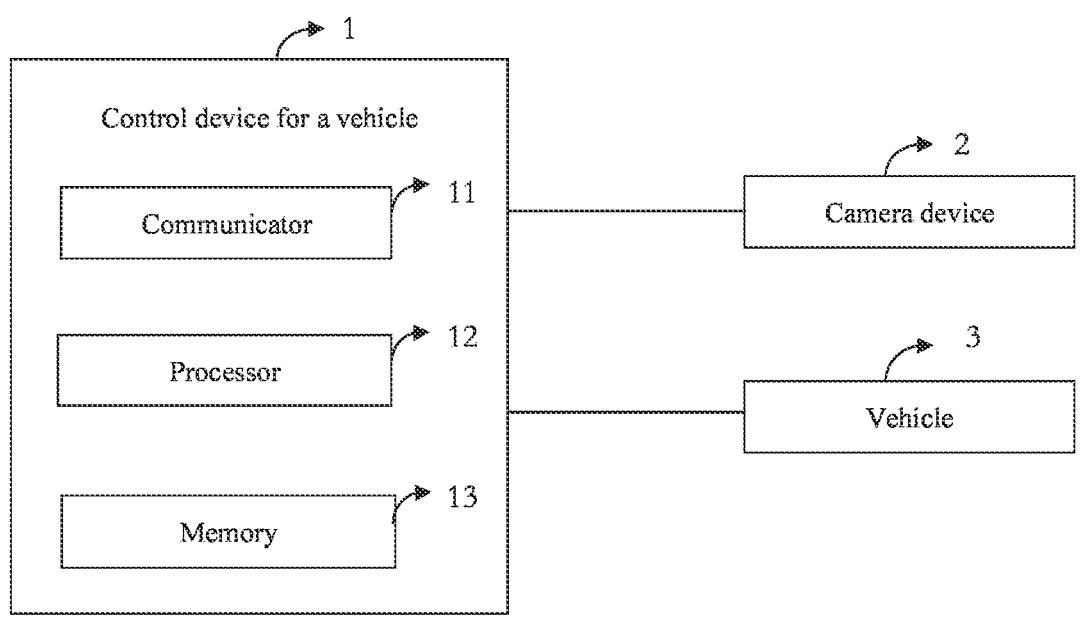
FIG. 1 is a schematic view of an embodiment of an application environment of a control method for a vehicle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, shows a schematic view of an application environment of a control method for a vehicle. The control method for a vehicle is applied in a control device 1 for a vehicle. In an embodiment, the control device 1 for a vehicle may be a programmable logic controller (PLC), an industrial control computer, a single-chip microcomputer, and other devices. In an embodiment, the control device 1 for a vehicle includes at least a communicator 11, a processor 12 and a memory 13. The control device 1 for a vehicle is communicatively connected with a camera device 2 and a vehicle 3 through the communicator 11. In an embodiment, the communicator 11 may be a wireless communication module. For example, the communicator 11 may be a WI-FI module or a 4G/5G communication module. The communicator 11 is used to receive information sent by the camera device 2. For example, the communicator 11 receives first image information sent by the camera device 2.

The processor 12 is coupled to the communicator 11. In an embodiment, the processor 12 may be a central processing unit (CPU), or other general-purpose processors, digital signal processors (DSPs), and application specific integrated circuits (ASIC), Field-Programmable Gate Array (FPGA) or other programmable logic devices, discrete gates or transistor logic devices, discrete hardware components, etc. In another embodiment, the processor 12 may be a microprocessor or any conventional processor, etc. The processor 12 may also be a control center of the control device 1 for a vehicle, which uses various interfaces and lines to connect various parts of the entire control device 1 for a vehicle.

In an embodiment, the memory 13 is connected to the processor 12 for storing data and/or software codes. In an embodiment, the memory 13 may be an internal storage unit in the control device 1 for a vehicle, for example, a hard disk or a memory in the control device 1 for a vehicle. In another embodiment, the memory 13 may also be an external storage device in the control device 1 for a vehicle, such as a plug-in hard disk equipped on the control device 1 for a vehicle, or a smart memory card (SMC), a secure digital (SD) card, a Flash Card, etc.

Figure 2:
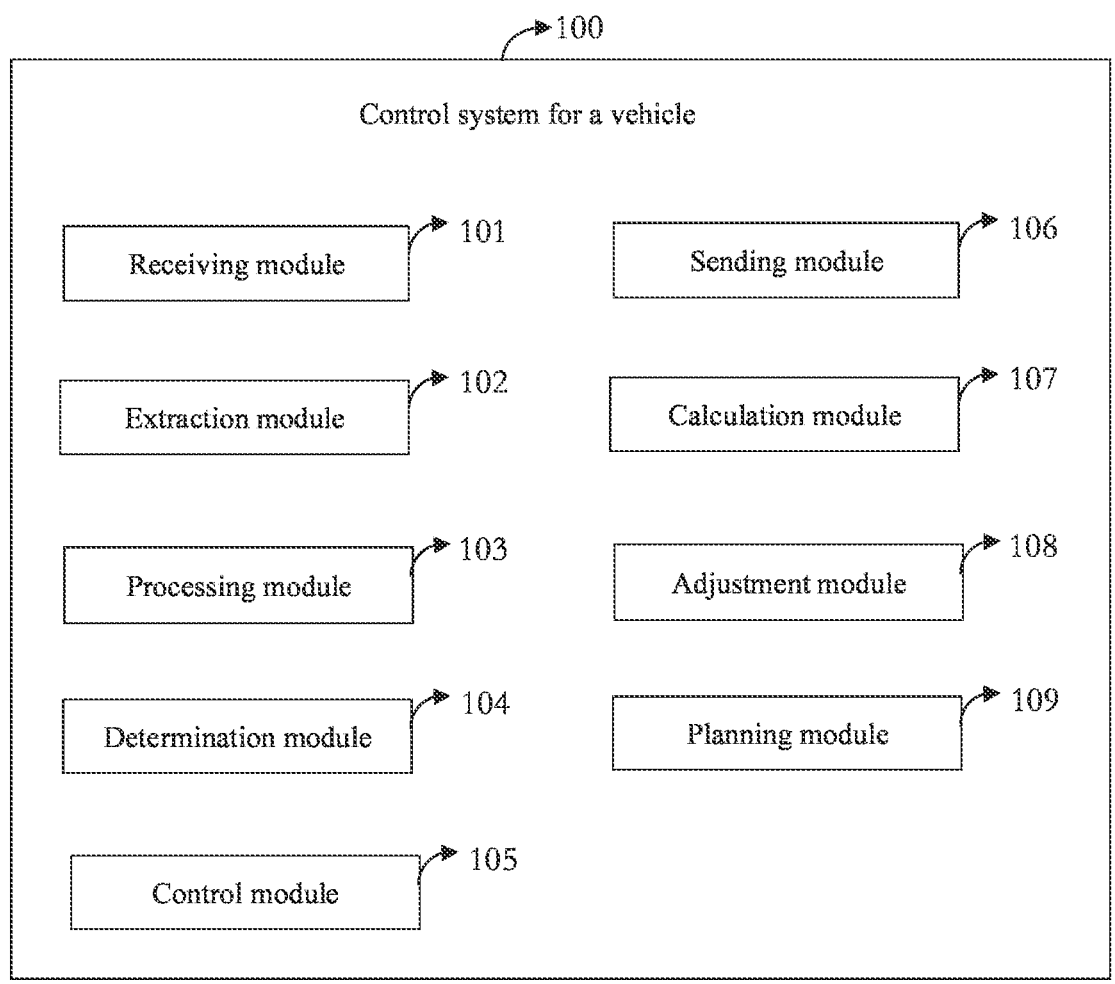
FIG. 2 is a functional block diagram of an embodiment of a control system for the vehicle.

FIG. 2 shows a functional block diagram of an embodiment of a control system 100 for the vehicle. The control system 100 for the vehicle includes one or a plurality of modules, the one or a plurality of modules work in the control system 100 for the vehicle. In an embodiment, the control system 100 for the vehicle at least includes a receiving module 101, an extraction module 102, a processing module 103, a determination module 104, a control module 105, a sending module 106, a calculation module 107, an adjustment module 108, and a planning module 109. The modules 101-109 can be stored in the storage device 13 of the control device 1 for a vehicle and executed by the processor 12. The modules 101-109 also can include functionality represented as hardware or integrated circuits, or as software and hardware combinations, such as a special-purpose processor or a general-purpose processor with special-purpose firmware.

The receiving module 101 receives data in a first image from a camera device (first image information). The first image information is image information obtained by the camera device capturing a view of physical label in an environment where a vehicle is located. When relative positions of the camera device and the vehicle can be obtained, the camera device can be installed in the environment where the vehicle is located. Or, if image-capture of the physical label will always be successful, the camera device can be installed on the vehicle. In an embodiment, the camera device is installed on the vehicle as an example. The physical label includes a plurality of label categories. The physical label can be composed of a plurality of alternative patterns, such as a combination of four two-dimensional code labels and five black squares. The physical label can also express further information in graphical form, making position estimation more accurate and precise. The label categories of the physical label may include, but are not limited to, two-dimensional codes, AprilTags visual standard library label codes (AprilLabel for short), Augmented Reality Label (ARLabel for short), and binary square markers (ArUco marker for short).

The extraction module 102 extracts label information in the first image information. The label information is image information corresponding to the physical label in the first image information, such as label corners, a label identifier, and a size of the physical label, etc.

The extraction module 102 performs edge detection on the label information and extracts a total number of edges. An edge detection algorithm, such as a Sobel operator, a Laplacian operator, a Canny operator, can be used to perform edge detection on the label information and extract the total number of edges.

The processing module 103 normalizes the total number of edges to form a first label clarity.

Usually, the edge detection algorithm is used for autofocusing, based on differences between adjacent pixels to determine the edge, but it is not used as an index to evaluate a quality of an image. In embodiments of the present disclosure, the edge detection algorithm can be applied to detect whether the image has sufficient clarity. The principle of obtaining a clarity is based on how an image has been blurred, and a blurring process (such as Gaussian blur) is continued, an amount of changes in high-frequency component is small, but if the image is clear, after a blurring process, the high-frequency component will change very much. Since in the actual industrial environment envisaged by the present disclosure, the clearest image can be obtained in advance (the label information is captured in an ideal state such as static and precise focusing), the total number of edges is extracted from the clearest image, and then the total number of edges is normalized. A confidence interval is set and a lower limit of the confidence interval is determined as a preset threshold. For example, the total number of edges extracted from the clearest image may be 10, after normalization may be 0.5, the confidence interval being ±0.2, then the preset threshold is "0.3". In the same way, after extracting the total number of edges from the captured image (such as the first image information), it is normalized to obtain the first label with sufficient clarity (first label clarity).

Optionally, the first image information includes first graphic and second graphic. The label information includes first label data corresponding to the first graphic and second label data corresponding to the second graphic. The processing module 103 normalizes the total number of edges to obtain the first label clarity, which specifically includes: normalizing the total number of edges to form a first clarity corresponding to the first label data; determining whether the first clarity is less than the preset threshold; obtaining a second clarity corresponding to the second label data, in response that the first clarity is less than the preset threshold; determining that the second clarity is greater than or equal to the preset threshold; determining that the second clarity is used as the first label clarity, in response that the second clarity is greater than or equal to the preset threshold.

In the above embodiment, a sequence formed by acquiring a plurality of images at a time may be stored. The first clarity of the first label data corresponding to the first graphic is calculated first. If the first clarity is less than the preset threshold, it indicates that the first graphic is not clear, then the second clarity of the second label data corresponding to the second graphic is obtained. If the second clarity is greater than or equal to the preset threshold, it indicates that the second graphic is clear. The acquired second clarity can be understood as the second clarity formed by the next image acquired in addition to the first image, or it can be understood as the second clarity obtained by retrieving a part of the entire edge of the first image information. As long as one graphic (such as the first graphic or the second graphic) is available in the first image information, it can be considered that the first image information is sufficiently clear.

The determining module 104 determines whether the first label clarity is greater than or equal to a preset threshold.

The preset threshold is a criterion for determining whether the graphic is clear, and obtaining the preset threshold is as described in the foregoing. If the first label clarity is greater than or equal to the preset threshold, it means that the first image information is clear. Conversely, if the first label clarity is less than the preset threshold, it means that the first image information is not clear. For example, if an obtained first label definition is 0.4 and the preset threshold is 0.3, it indicates that the first image is clear.

The control module 105 controls the vehicle to move to a parking position according to the first image information, in response that the first label clarity is greater than or equal to the preset threshold.

The camera device is installed on the vehicle, and the physical label corresponding to the label information is at or on the parking position. The control module 105 controls the vehicle to move to the parking position, which specifically includes: forming a first offset between an imaging center position of the camera device and a spatial position of the physical label according to the label information, in response that the first label clarity is greater than or equal to the preset threshold; forming a second offset according to the imaging center position and an installation position of the camera device; forming a third offset according to the installation position and a center position of the vehicle's axle; forming a first target offset from wheels connected to the axle to the parking position according to the first offset, the second offset, and the third offset. The vehicle is controlled to move to the parking according to the first target offset.

The first offset can be calculated according to the PNP algorithm of the label. The second offset formed by the imaging center position of the camera device and the installation position of the camera device can be obtained by correcting internal parameters of the camera device. The camera device is installed on the vehicle, and as the vehicle moves, there is a fixed distance between the installed position of the camera device and the center position of the wheel shaft, that is, the third offset, which belongs to a known mechanical parameter. According to the first offset, the second offset, and the third offset, the first target offset from wheels connected to the axle to the parking position can be calculated, and the offset between the wheels and the parking position is determined. Finally, according to the first target offset, the vehicle can be controlled to move to the parking position.

Figure 3:
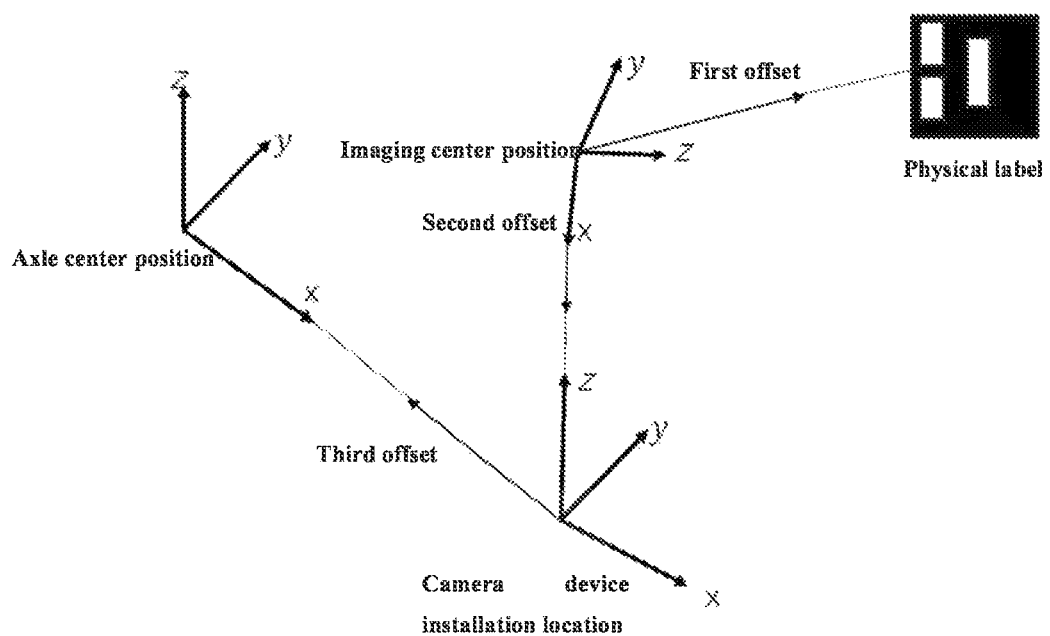
FIG. 3 illustrates a schematic view of an embodiment of an offset between the positions of a plurality of objects.

FIG. 3 is a schematic view of the offset between the respective positions of a plurality of objects in an embodiment of the present disclosure.

Optionally, the receiving module 101 receives image-capturing parameters from the camera device. The control module 105 forms the first offset between the imaging center position of the camera device and the spatial position of the physical label, which specifically includes: extracting the label corners and the label identifier of the label information, in response that the first label clarity is greater than or equal to a preset threshold; forming the first offset according to the label corners, the label identifier, the size of the physical label, and the image-capturing parameters.

In an embodiment of the present disclosure, the label corners are the image coordinates (2D) of four label corners, the label identifier is an ID used to identify the label, the size of the physical label is the length of the square, and the image-capturing parameters include values of variables such as shutter, aperture, ISO, EV value, whether to turn on the flash, and other functional parameters.

In the above embodiment, a 3D posture of the camera device can be calculated by the known size of the physical label, the image coordinates (2D) of the four corners, the label identifier, and the image-capturing parameters. Specifically, the first offset can be calculated according to a PNP (Perspective-n-Point) algorithm. The PNP algorithm describes a relationship between 2D image points and the 3D space points. Using multiple sets of 2D points/3D points, the first offset between the imaging center position of the camera device and the spatial position of the physical label can be calculated.

Optionally, the determining module 104 can also determine whether the clarity is less the preset threshold.

The sending module 106 sends an acquisition instruction in response that the clarity is less than the preset threshold; the receiving module 101 receives second image information in accordance with the acquisition instruction; the extraction module 102 extracts the second image label information in the second image information; the extraction module 102 performs edge detection on the second image label information to extract a total number of edges of the second image label; the processing module 103 normalizes the total number of edges of the second image label to form a second label clarity; the determining module 104 determines that the second label clarity is greater than or equal to the preset threshold; the control module 105 controls the vehicle to move to the parking position according to the second image information, in response that the second label clarity is greater than or equal to the preset threshold.

The applicable scenario of the alternative implementation is that only one image is acquired at a time. If the first label clarity of the first image information currently acquired is less than the preset threshold, it indicates that the current first image information is not clear, and it is necessary to send an acquisition instruction to the communicator and receive the second image information. The second label clarity is calculated according to the above method. If the second label clarity is greater than or equal to the preset threshold, it is indicated that the second image information is clear, and the vehicle can be controlled to move to the parking position according to the second image information. On the contrary, if the second label clarity is less than the preset threshold, it is necessary to send instruction for further acquisition to the communicator and receive third image information, until it is determined that a certain label clarity is greater than or equal to the preset threshold.

Optionally, the receiving module 101 receives size information of materials at the parking position; the calculation module 107 forms a fourth offset between the position of the physical label and a center position of the materials according to the size information; the adjustment module 108 adjusts the first target offset to the second target offset according to the fourth offset; the control module 105 controls the vehicle to move to the parking position according to the second target offset.

Figure 4:
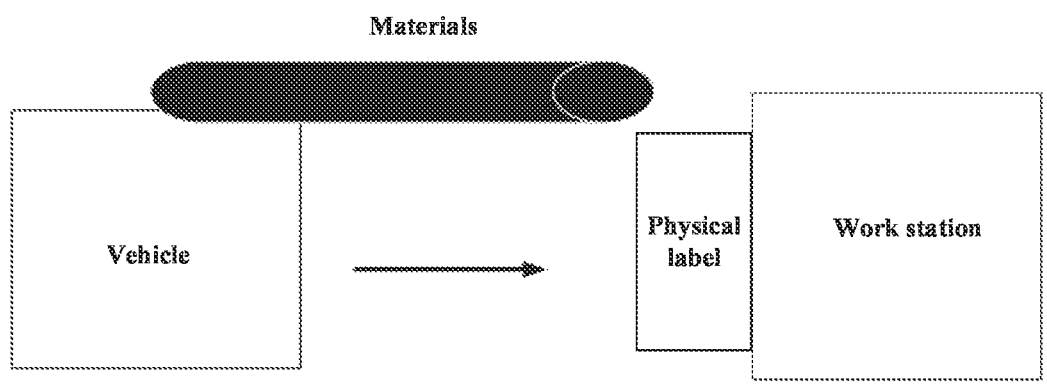
FIG. 4 illustrates a schematic view of an embodiment of vehicle materials being docked with a work station.

In the above embodiment, due to the different sizes of the materials, the parking position required for the vehicle to dock with the work station will be different. For example, if materials include a large drum, the parking position needs to be farther away from the work station. If the materials are small, the parking position needs to be closer to the work station. Therefore, it is necessary to calculate the fourth offset between the position of the physical label and the center position of the materials according to the size information of the materials. Generally, after the material sizes are determined, the fourth offset is determined, such as 2 cm. The first target offset is adjusted according to the fourth offset, so that correct docking can be better achieved. FIG. 4 is a schematic diagram of vehicle materials being docked with the work station in an embodiment of the present disclosure. The physical label is usually located on the work station, and the offset between a center of the materials and the physical label is adjusted according to the size of the materials, that is, the position of the vehicle is adjusted, so as to better realize the docking of the material on the vehicle to the work station. The vehicular positions of materials, physical tags, work stations, and vehicles shown in FIG. 5 are merely exemplary expressions and do not constitute limitations of the present disclosure.

Optionally, the planning module 109 plans a movement path according to the first target offset; the adjustment module 108 also adjusts a rotation speed difference of the wheels according to the movement path, and the control module 105 controls the vehicle to move and then stop at or on the parking position at a preset position and a preset angle.

Figure 5:
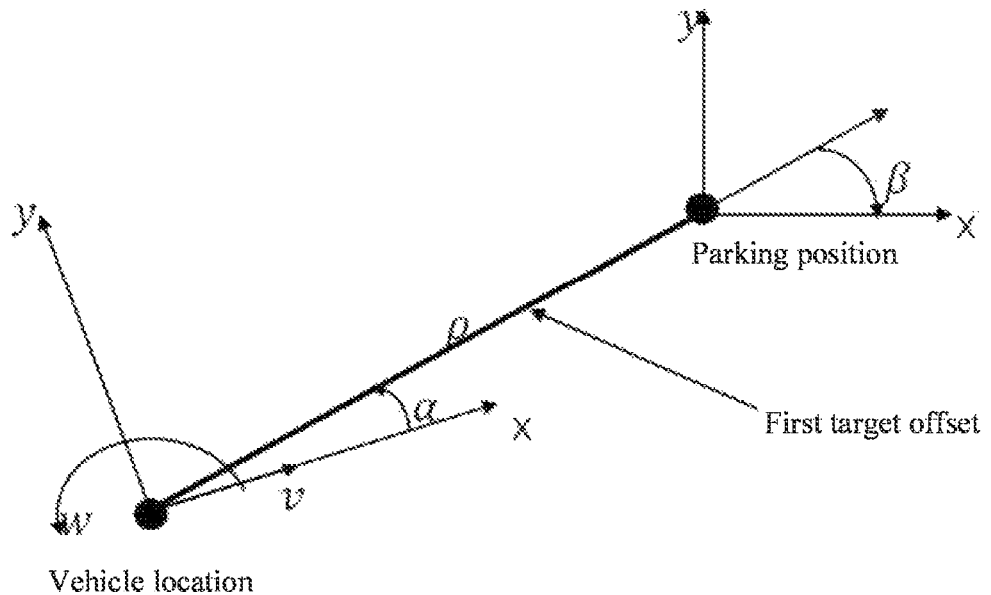
FIG. 5 illustrates a schematic view of an embodiment of the movement of the vehicle being controlled according to an offset.

Specifically, FIG. 5 illustrates the movement control of the vehicle according to the offset in an embodiment of the present disclosure.

As shown in FIG. 5, movement control can be calculated according to the following formula:

$$v = k_\rho \rho$$

$$w = k_\alpha \alpha + k_\beta \beta$$

$$k_\rho > 0; k_\beta < 0; k_\alpha + \frac{5}{3}k_\beta - \frac{2}{\pi}k_\rho > 0$$

$k_\rho$, $k_\alpha$ and $k_\beta$ are fixed parameters, $\alpha$ is an angle between the x-axis line of the vehicle position and a preset line, the preset line is a line between the vehicle position and the parking position, $\beta$ is an angle between the x-axis line of the parking position and the preset line, $\rho$ is a length of a line segment between the vehicle position and the parking position, v is a speed of a control point, and w is an angular speed of the control point.

Based on v and w calculated by the above formula, $V_L$ and $V_R$ can be calculated according to the following formula:

$$\begin{bmatrix} V_L \\ V_R \end{bmatrix} = \begin{bmatrix} 1 & -R \\ 1 & R \end{bmatrix} \begin{bmatrix} v \\ w \end{bmatrix}$$

$V_L$ is a speed of a left wheel relative to the ground, and $V_R$ is a speed of a right wheel relative to the ground.

In addition, it is also possible to actually measure v and w, and calculate the actual and based on the actual measurements of v and w. Then, a rotation speed difference of the wheels is adjusted, according to the theoretically calculated $V_L$ and $V_R$ and the actual measurements $V_L$ and $V_R$. Finally, the vehicle is controlled to move and park at the parking position at the preset position and the preset angle. The rotation speed difference is a speed of the wheel relative to the ground when the wheel is in the final state of the parking position. The preset position is a final position of the vehicle at the parking position. The preset angle is a final angle of the vehicle at the parking position.

Figure 6:
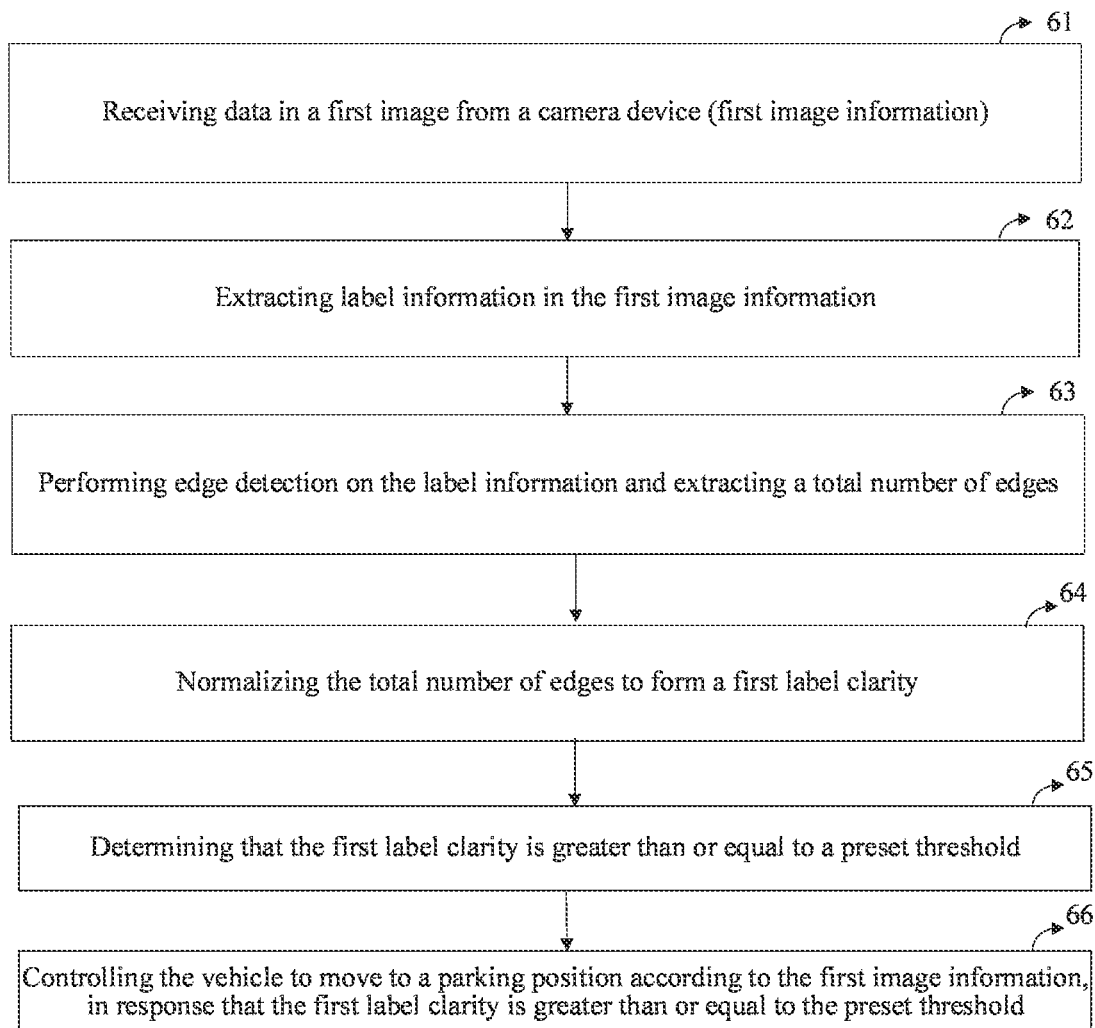
FIG. 6 illustrates a flowchart of an embodiment of a control method for the vehicle.

FIG. 6 illustrates a flowchart of an embodiment of a control method for vehicle. The control method is provided by way of example, as there are a variety of ways to carry out the method. The method described below can be carried out using the configurations illustrated in FIG. 6, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added, or fewer blocks may be utilized, without departing from this disclosure. The example method can begin at block 61.

At block 61, receiving data in a first image from a camera device (first image information).

The first image information is image information obtained by the camera device capturing a view of physical label in an environment where a vehicle is located.

The camera device can be installed in the environment where the vehicle is located, or can be installed on the vehicle.

The physical label includes a plurality of label categories. The physical label can be composed of a plurality of alternative patterns, such as a combination of four two-dimensional code labels and five black squares. The physical label can also express further information in graphical form, making position estimation more accurate and precise. The label categories of the physical label may include, but are not limited to, two-dimensional codes, AprilTags visual standard library label codes (AprilLabel for short), Augmented Reality Label (ARLabel for short), and binary square markers (ArUco marker for short).

At block 62, extracting label information in the first image information.

The label information is image information corresponding to the physical label in the first image information, such as a label corners, a label identifier, and a size of the physical label, etc.

At block 63, performing edge detection on the label information and extracting a total number of edges.

An edge detection algorithm, such as a Sobel operator, a Laplacian operator, a Canny operator, can be used to perform edge detection on the label information and extract the total number of edges.

At block 64, normalizing the total number of edges to form a first label clarity.

Usually, the edge detection algorithm is used for autofocusing, based on differences between adjacent pixels to determine the edge, but it is not used as an index to evaluate a quality of an image. In embodiments of the present disclosure, the edge detection algorithm can be applied to detect whether the image has sufficient clarity. The principle of obtaining a clarity is based on how an image has been blurred, and a blurring process (such as Gaussian blur) is continued, an amount of changes in high-frequency component is small, but if the image is clear, after a blurring process, the high-frequency component will change very much. Since in the actual industrial environment envisaged by the present disclosure, the clearest image can be obtained in advance (the label information is captured in an ideal state such as static and precise focusing), the total number of edges is extracted from the clearest image, and then the total number of edges is normalized. A confidence interval is set and a lower limit of the confidence interval is determined as a preset threshold. For example, the total number of edges extracted from the clearest image may be 10, after normalization may be 0.5, the confidence interval being ±0.2, then the preset threshold is "0.3". In the same way, after extracting the total number of edges from the captured image (such as the first image information), it is normalized to obtain the first label with sufficient clarity (first label clarity).

Optionally, the first image information includes first graphic and second graphic. The label information includes first label data corresponding to the first graphic and second label data corresponding to the second graphic. The method of normalizing the total number of edges to obtain the first label clarity, which specifically includes: normalizing the total number of edges to form a first clarity corresponding to the first label data; determining whether the first clarity is less than the preset threshold; obtaining a second clarity corresponding to the second label data, in response that the first clarity is less than the preset threshold; determining that the second clarity is greater than or equal to the preset threshold; determining that the second clarity is used as the first label clarity, in response that the second clarity is greater than or equal to the preset threshold.

In the above embodiment, a sequence formed by acquiring a plurality of images at a time may be stored. The first clarity of the first label data corresponding to the first graphic is calculated first. If the first clarity is less than the preset threshold, it indicates that the first graphic is not clear, then the second clarity of the second label data corresponding to the second graphic is obtained. If the second clarity is greater than or equal to the preset threshold, it indicates that the second graphic is clear. The acquired second clarity can be understood as the second clarity formed by the next image acquired in addition to the first image, or it can be understood as the second clarity obtained by retrieving a part of the entire edge of the first image information. As long as one graphic (such as the first graphic or the second graphic) is available in the first image information, it can be considered that the first image information is sufficiently clear.

At block 65, determining that the first label clarity is greater than or equal to a preset threshold.

The preset threshold is a criterion for determining whether the graphic is clear. If the first label clarity is greater than or equal to the preset threshold, it means that the first image information is clear. Conversely, if the first label clarity is less than the preset threshold, it means that the first image information is not clear.

At block 66, controlling the vehicle to move to a parking position according to the first image information, in response that the first label clarity is greater than or equal to the preset threshold.

The camera device is installed on the vehicle, and the physical label corresponding to the label information is at or on the parking position. The method of controlling the vehicle to move to the parking position, which specifically includes: forming a first offset between an imaging center position of the camera device and a spatial position of the physical label according to the label information, in response that the first label clarity is greater than or equal to the preset threshold; forming a second offset according to the imaging center position and an installation position of the camera device; forming a third offset according to the installation position and a center position of the vehicle's axle; forming a first target offset from wheels connected to the axle to the parking position according to the first offset, the second offset, and the third offset. The vehicle is controlled to move to the parking according to the first target offset.

The first offset can be calculated according to the PNP algorithm of the label. The second offset formed by the imaging center position of the camera device and the installation position of the camera device can be obtained by correcting internal parameters of the camera device. The camera device is installed on the vehicle, and as the vehicle moves, there is a fixed distance between the installed position of the camera device and the center position of the wheel shaft, that is, the third offset, which belongs to a known mechanical parameter. According to the first offset, the second offset, and the third offset, the first target offset from wheels connected to the axle to the parking position can be calculated, and the offset between the wheel and the parking position is determined. Finally, according to the first target offset, the vehicle can be controlled to move to the parking position.

FIG. 3 is a schematic view of the offset between the respective positions of a plurality of objects in an embodiment of the present disclosure.

Optionally, the method further includes receiving image-capturing parameters from the camera device. The method of forming the first offset between the imaging center position of the camera device and the spatial position of the physical label, which specifically includes: extracting the label corners and the label identifier of the label information, in response that the first label clarity is greater than or equal to a preset threshold; forming the first offset according to the label corners, the label identifier, the size of the physical label, and the image-capturing parameters.

In an embodiment of the present disclosure, the label corners are the image coordinates (2D) of four label corners, the label identifier is an ID used to identify the label, the size of the physical label is the length of the square, and the image-capturing parameters include values of variables such as shutter, aperture, ISO, EV value, whether to turn on the flash, and other functional parameters.

In the above embodiment, a 3D posture of the camera device can be calculated by the known size of the physical label, the image coordinates (2D) of the four corners, the label identifier, and the image-capturing parameters. Specifically, the first offset can be calculated according to a PNP (Perspective-n-Point) algorithm. The PNP algorithm describes a relationship between 2D image points and the 3D space points. Using multiple sets of 2D points/3D points, the first offset between the imaging center position of the camera device and the spatial position of the physical label can be calculated.

Optionally, the method also includes: determining that the clarity is less or more than the preset threshold; sending an acquisition instruction in response that the clarity is less than the preset threshold; receiving second image information in accordance with the acquisition instruction; extracting the second image label information in the second image information; performing edge detection on the second image label information to extract a total number of edges of the second image label; normalizing the total number of edges of the second image label to form a second label clarity; determining that the second label clarity is greater than or equal to the preset threshold; controlling the vehicle to move to the parking position according to the second image information, in response that the second label clarity is greater than or equal to the preset threshold.

The applicable scenario of the alternative implementation is that only one image is acquired at a time. If the first label clarity of the first image information currently acquired is less than the preset threshold, it indicates that the current first image information is not clear, and it is necessary to send an acquisition instruction to the communicator and receive the second image information. The second label clarity is calculated according to the above method. If the second label clarity is greater than or equal to the preset threshold, it is indicated that the second image information is clear, and the vehicle can be controlled to move to the parking position according to the second image information. On the contrary, if the second label clarity is less than the preset threshold, it is necessary to send instruction for further acquisition to the communicator and receive third image information, until it is determined that a certain label clarity is greater than or equal to the preset threshold.

Optionally, the method also includes: receiving size information of materials at the parking position; forming a fourth offset between the position of the physical label and a center position of the materials according to the size information; adjusting the first target offset to the second target offset according to the fourth offset; controlling the vehicle to move to the parking position according to the second target offset.

In the above embodiment, due to the different sizes of the materials, the parking position required for the vehicle to dock with the work station will be different. For example, if materials include a large drum, the parking position needs to be farther away from the work station. If the materials are small, the parking position needs to be closer to the work station. Therefore, it is necessary to calculate the fourth offset between the position of the physical label and the center position of the materials according to the size information of the materials. Generally, after the material sizes are determined, the fourth offset is determined, such as 2 cm. The first target offset is adjusted according to the fourth offset, so that correct docking can be better achieved. FIG. 4 is a schematic diagram of vehicle materials being docked with the work station in an embodiment of the present disclosure. The physical label is usually located on the work station, and the offset between a center of the materials and the physical label is adjusted according to the size of the materials, that is, the position of the vehicle is adjusted, so as to better realize the docking of the material on the vehicle to the work station. The vehicular positions of materials, physical tags, work stations, and vehicles shown in FIG. 5 are merely exemplary expressions and do not constitute limitations of the present disclosure.

Optionally, the method also includes: planning a movement path according to the first target offset; adjusting a rotation speed difference of the wheels according to the movement path to control the vehicle to move and then stop at or on the parking position at a preset position and a preset angle.

In the above embodiment, related principles of forward kinematics and inverse kinematics can be used to control the parking of the vehicle. The forward kinematics and the inverse kinematics belong to two reciprocal kinematics.

Specifically, FIG. 5 illustrates the movement control of the vehicle according to the offset in an embodiment of the present disclosure.

As shown in FIG. 5, movement control can be calculated according to the following formula:

$$v = k_\rho \rho$$
$$w = k_\alpha \alpha + k_\beta \beta$$
$$k_\rho > 0; k_\beta < 0; k_\alpha + \frac{5}{3}k_\beta - \frac{2}{\pi}k_\rho > 0$$

$k_\rho$, $k_\alpha$ and $k_\beta$ are fixed parameters, $\alpha$ is an angle between the x-axis line of the vehicle position and a preset line, the preset line is a line between the vehicle position and the parking position, $\beta$ is an angle between the x-axis line of the parking position and the preset line, $\rho$ is a length of a line segment between the vehicle position and the parking position, v is a speed of a control point, and w is an angular speed of the control point.

Based on v and w calculated by the above formula, $V_L$ and $V_R$ can be calculated according to the following formula:

$$\begin{bmatrix} V_L \\ V_R \end{bmatrix} = \begin{bmatrix} 1 & -R \\ 1 & R \end{bmatrix} \begin{bmatrix} v \\ w \end{bmatrix}$$

$V_L$ is a speed of a left wheel relative to the ground, and $V_R$ is a speed of a right wheel relative to the ground.

In addition, it is also possible to actually measure v and w, and calculate the actual $V_L$ and $V_R$ based on the actual measurements of v and w. Then, a rotation speed difference of the wheels is adjusted, according to the theoretically calculated $V_L$ and $V_R$ and the actual measurements $V_L$ and $V_R$. Finally, the vehicle is controlled to move and park at the parking position at the preset position and the preset angle. The rotation speed difference is a speed of the wheel relative to the ground when the wheel is in the final state of the parking position. The preset position is a final position of the vehicle at the parking position. The preset angle is a final angle of the vehicle at the parking position.

In the method described in FIG. 6, the first image information can be received in real time, and the first image information does not need to be obtained after the vehicle is completely stationary, thereby reducing the number of starts and stops of the vehicle. In addition, the first label clarity of the first image information can also be determined in real time. Once it is determined that the first label clarity is greater than or equal to the preset threshold, the vehicle can be controlled to move to the parking position based on the first image information. Since there is no need to wait for the vehicle to be completely stationary, only the first image information is required to be clear enough to control the movement of the vehicle, which can effectively reduce the number of starts and stops of the vehicle and shortens the parking time of the vehicle.

It is believed that the present embodiments and their available will be understood from the foregoing description, and it will be apparent that various changes may be made thereto without departing from the spirit and scope of the disclosure or sacrificing all of its material available, the examples hereinbefore described merely being embodiments of the present disclosure.

What is claimed is:

1. A control device for a vehicle comprising:
   a processor configured to:
   extract label information in first image information received from a camera device;
   perform edge detection on the label information and extract a total number of edges;
   normalize the total number of edges to form a first label clarity;
   determine that the first label clarity is greater than or equal to a preset threshold;
   control the vehicle to move to a parking position according to the first image information, in response that the first label clarity is greater than or equal to the preset threshold;
   wherein the camera device is installed on the vehicle, and a physical label corresponding to the label information is at or on the parking position;
   the processor is further configured to:
   form a first offset between an imaging center position of the camera device and a spatial position of the physical label according to the label information, in response that the first label clarity is greater than or equal to the preset threshold;
   form a second offset according to the imaging center position and an installation position of the camera device;
   form a third offset according to the installation position and a center position of the vehicle's axle;
   form a first target offset from wheels connected to the axle to the parking position according to the first offset, the second offset, and the third offset
   control the vehicle to move to the parking position according to the first target offset.

2. The control device according to claim 1, wherein the first image information comprises first graphic and second graphic, the label information comprises first label data corresponding to the first graphic and second label data corresponding to the second graphic, the processor is further configured to:
   normalize the total number of edges to form a first clarity corresponding to the first label data;
   determine whether the first clarity is less than the preset threshold;
   obtain a second clarity corresponding to the second label data, in response that the first clarity is less than the preset threshold;

determine that the second clarity is greater than or equal to the preset threshold;

determine that the second clarity is used as the first label clarity, in response that the second clarity is greater than or equal to the preset threshold.

3. The control device according to claim 1, wherein:
the processor is further configured to:
determine whether the first label clarity is less than the preset threshold,
extract second image label information in second image information, the second image information being received by the control device in accordance with an acquisition instruction that is sent by the processor in response that the first label clarity is less than the preset threshold;
perform edge detection on the second image label information to extract a total number of edges of the second image label;
normalize the total number of edges of the second image label to form a second label clarity;
determine that the second label clarity is greater than or equal to the preset threshold;
control the vehicle to move to the parking position according to the second image information, in response that the second label clarity is greater than or equal to the preset threshold.

4. The control device according to claim 1, wherein the processor is further configured to:
extract label corners and a label identifier of the label information, in response that the first label clarity is greater than or equal to a preset threshold;
form the first offset according to the label corners, the label identifier, a size of the physical label, and image-capturing parameters received from the camera device.

5. The control device according to claim 1, wherein the processor is further configured to:
form a fourth offset between the spatial position and a center position of the materials according to size information of materials at the parking position received by the control device;
adjust the first target offset to a second target offset according to the fourth offset;
control the vehicle to move to the parking position according to the second target offset.

6. The control device according to claim 1, wherein the processor is further configured to:
plan a movement path according to the first target offset;
adjust a rotation speed difference of the wheels according to the movement path to control the vehicle to move and then stop at or on the parking position at a preset position and a preset angle.

7. A control method for a vehicle, comprising:
receiving first image information from a camera device;
extracting label information in the first image information;
performing edge detection on the label information and extracting a total number of edges;
normalizing the total number of edges to form a first label clarity;
determining that the first label clarity is greater than or equal to a preset threshold;
controlling the vehicle to move to a parking position according to the first image information, in response that the first label clarity is greater than or equal to the preset threshold;
wherein the camera device is installed on the vehicle, and a physical label corresponding to the label information is at or on the parking position;
and said controlling the vehicle to move to the parking position comprises:
forming a first offset between an imaging center position of the camera device and a spatial position of the physical label according to the label information, in response that the first label clarity is greater than or equal to the preset threshold;
forming a second offset according to the imaging center position and an installation position of the camera device;
forming a third offset according to the installation position and a center position of the vehicle's axle;
forming a first target offset from wheels connected to the axle to the parking position according to the first offset, the second offset, and the third offset controlling the vehicle to move to the parking position according to the first target offset.

8. The control method according to claim 7, wherein the first image information comprises first graphic and second graphic, the label information comprises first label data corresponding to the first graphic and second label data corresponding to the second graphic, said forming the first label clarity comprises:
normalizing the total number of edges to form a first clarity corresponding to the first label data;
determining whether the first clarity is less than the preset threshold;
obtaining a second clarity corresponding to the second label data, in response that the first clarity is less than the preset threshold,;
determining that the second clarity is greater than or equal to the preset threshold;
determining that the second clarity is used as the first label clarity, in response that the second clarity is greater than or equal to the preset threshold.

9. The control method according to claim 7, further comprising:
determining whether the first label clarity is less than the preset threshold,
receiving second image information in accordance with an acquisition instruction, sent in response that the first label clarity is less than the preset threshold;
extracting second image label information in the second image information;
performing edge detection on the second image label information to extract a total number of edges of the second image label;
normalizing the total number of edges of the second image label to form a second label clarity;
determining that the second label clarity is greater than or equal to the preset threshold;
controlling the vehicle to move to the parking position according to the second image information, in response that the second label clarity is greater than or equal to the preset threshold.

10. The control method according to claim 7, further comprising:
receiving image-capturing parameters from the camera device; and
wherein said the method of forming the first offset between the imaging center position of the camera device and the spatial position of the physical label comprises:

extracting label corners and a label identifier of the label information, in response that the first label clarity is greater than or equal to a preset threshold;

forming the first offset according to the label corners, the label identifier, a size of the physical label, and the image-capturing parameters.

11. The control method according to claim 7, further comprising:

receiving size information of materials at the parking position;

forming a fourth offset between the spatial position and a center position of the materials according to the size information;

adjusting the first target offset to a second target offset according to the fourth offset;

controlling the vehicle to move to the parking position according to the second target offset.

12. The control method according to claim 7, further comprising:

planning a movement path according to the first target offset;

adjusting a rotation speed difference of the wheels according to the movement path to control the vehicle to move and then stop at or on the parking position at a preset position and a preset angle.

* * * * *